UNITED STATES PATENT OFFICE.

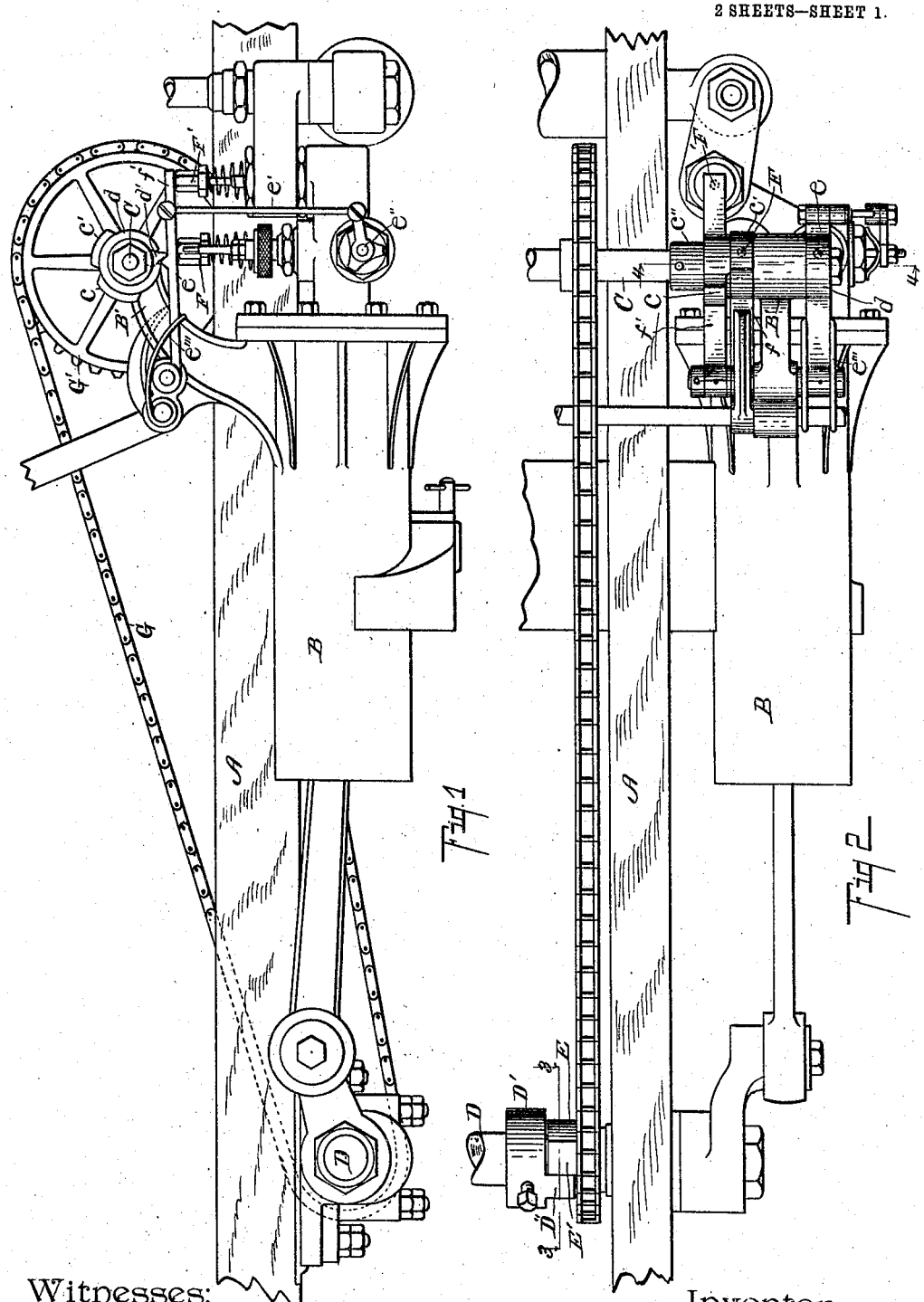

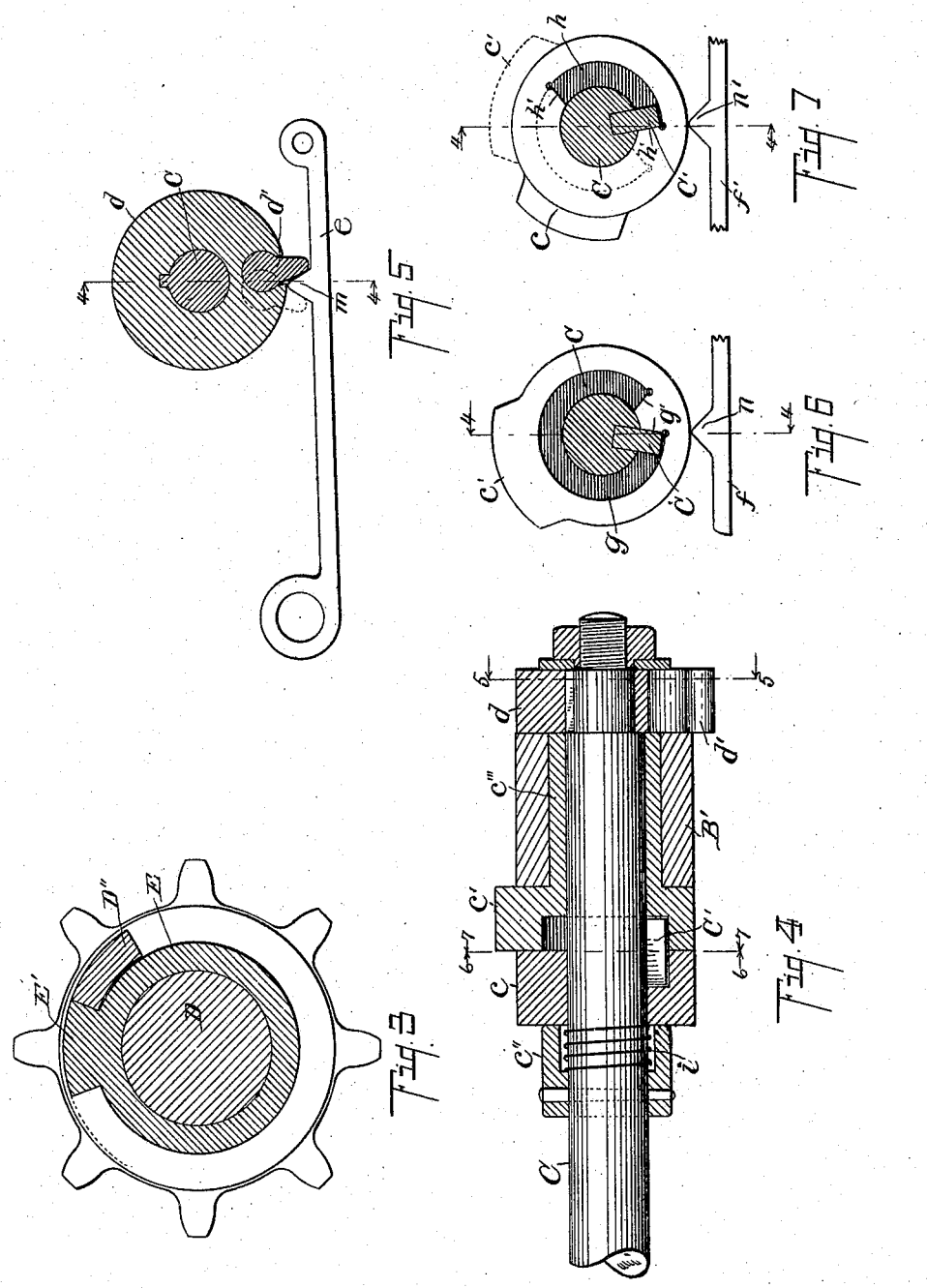

FRANK A. THOMAS, OF THREE RIVERS, MICHIGAN, ASSIGNOR TO THE SHEFFIELD CAR COMPANY, OF THREE RIVERS, MICHIGAN.

VALVE-GEAR FOR GAS ENGINES OR MOTORS.

No. 855,146.  Specification of Letters Patent.  Patented May 28, 1907.

Application filed November 20, 1903. Serial No. 181,952.

*To all whom it may concern:*

Be it known that I, FRANK A. THOMAS, a citizen of the United States, residing at the city of Three Rivers, in the county of St. Joseph and State of Michigan, have invented certain new and useful Improvements in Valve-Gear for Gas Engines or Motors, of which the following is a specification.

This invention relates to improvements in valve gear for explosive engines.

The main object of this invention is to provide in a gas engine or motor an improved means for operating the sparker and valves in the proper sequence when the engine is driven in either direction.

Further objects, and objects relating to structural details, will definitely appear in the detailed description to follow.

I accomplish the objects of my invention by the devices and means described in the following specification.

The invention is clearly defined and pointed out in the claims.

A structure embodying the features of my invention is fully illustrated in the accompanying drawing forming a part of this specification, in which—

Figure 1 is a detail side elevation view of a structure embodying the features of my invention. Fig. 2 is a detail plan view of the structure appearing in Fig. 1. Fig. 3 is an enlarged detail sectional view taken on a line corresponding to line 3 3 of Fig. 2. Fig. 4 is an enlarged detail longitudinal sectional view taken on lines 4 4 of Figs. 5, 6 and 7. Fig. 5 is an enlarged detail cross-sectional view taken on a line corresponding to line 5 5 of Fig. 4. Fig. 6 is a detail sectional view taken on line 6 6 of Fig. 4. Fig. 7 is a detail sectional view taken on a line corresponding to line 7 7 of Fig. 4.

In the drawing the sectional views are taken looking in the direction of the little arrows at the ends of the section lines, and similar letters of reference refer to similar parts throughout the several views.

Referring to the drawing, A represents the frame, which may be of any desired form to properly support the operative parts of the machine.

B represents the engine cylinder.

On the driving shaft D of the engine is a sprocket wheel E. A collar D' is secured to the shaft D by a set screw, as illustrated, or by any other suitable means. The collar D is provided with a laterally projecting arm or lug D" which projects over the hub of the sprocket wheel E. On the hub of the sprocket wheel E is an outwardly projecting lug or tooth E' adapted to engage the arm on the collar, thus connecting the wheel with the shaft. (See Figs. 2 and 3). When the shaft is driven in one direction, the arm or collar engages one side of the lug, and when driven in the opposite direction it engages the opposite side.

A cam shaft C is provided. Keyed to this cam shaft is a sprocket wheel G'. The sprocket wheels E and G' are connected by the sprocket chain G. On the shaft C are cams $d$, $c$ and $c'$, for the sparker, the exhaust valve, and the inlet valve, respectively. The sparker consists of a movable and a stationary electrode of the usual or any desired construction.

The rock shaft $e''$ of the movable electrode is provided with a suitable crank arm which is connected by the link $e'$ to the pivoted cam lever $e$. The lever $e$ is provided with an upwardly projecting cam $m$ which is engaged by a pivoted tooth $d'$ on the cam wheel $d$, whereby the lever $e$ is actuated. (See Figs. 1 and 5.) This pivoted tooth $d'$ forms the cam on the wheel $d$. The cam wheel $d$ is secured to the shaft C by a key or other suitable means.

A spring $e'''$ is provided for applying tension to the lever $e$. This spring, through the connections described, serves to return the movable electrode to its initial position. By means of the connection described, of the sprocket wheel E to the driving shaft D, the sparker is actuated at the proper time in the stroke of the piston, when the engine is driven in either direction.

A pivoted lever or arm $f$, having a cam $n$ thereon, rests upon the stem of the exhaust valve F. The lever $f$ is actuated by the cam $c$. The cam $c$ is loosely mounted on the shaft C. A key C' is carried by the shaft C. The cam $c$ is provided with an internal groove $g$ into which the key C' projects. A stop or tooth $g'$ is provided for engaging the key so that the cam is revolved with the shaft. This stop or tooth is properly located so that the cam $c$ is in proper relation to the sparker cam. When the shaft is reversed the cam is automatically shifted so that it still maintains its proper relation to the sparker cam.

A pivoted arm or lever $f'$ having a cam $n'$ thereon is provided for the inlet valve $F'$. This cam or lever is actuated by a cam $c'$. The cam $c'$ is also loosely mounted on the shaft C. This cam is provided with a groove $h$ to receive the key $C'$, the end of the groove forming a stop $h'$ therefor. This groove is located so that the cam $c'$ is positioned in proper relation to the sparker and the exhaust valve actuating cams. The groove $h$ is of such length that when the shaft is reversed the cam is shifted so that its proper relation to the sparker and exhaust cams is maintained.

With the parts thus arranged, the engine may be driven in either direction and the valves and the sparker will be operated in proper sequence. The adjustment is entirely automatic, which is, of course, of great advantage.

The cam $c'$ is provided with a hub $c'''$ which projects into a suitable bearing in the supporting bracket $B'$, thereby forming a support for the cam shaft. The cams $c\ c'$ are yieldingly held in position by the coiled spring $i$. This spring $i$ is arranged on the shaft C to bear against the cam $c$. The other end of the spring rests in the socket $c''$ which is suitably connected to the shaft.

My improved gas engine or motor is economical to construct and not likely to get out of repair. It is also very simple and compact and durable. I have illustrated and described the same in the form preferred by me on account of its simplicity and durability, and the economy of producing the same. I am aware, however, that it is capable of considerable variation in structural details without departing from my invention.

Having thus described my invention, what I claim as new and desire to secure by Letters Patent is—

1. In a gas engine, the combination with a driving shaft, of a sprocket wheel loosely mounted thereon having a projecting lug or tooth on the hub thereof; a collar fixed to said shaft having a projecting driving lug adapted to engage the lug on said sprocket wheel whereby the position of said sprocket wheel is shifted on the reversing of the driving shaft; a cam shaft; a sprocket wheel on said cam shaft; a connecting chain for said sprockets; exhaust and inlet valves; a sparker actuating lever having a cam projection thereon; a spring for returning said sparker lever to its initial position; a sparker cam having a pivoted tooth adapted to engage said cam projection on said sparker lever; an exhaust valve actuating cam loosely mounted on said cam shaft; an air inlet valve actuating cam loosely mounted on said cam shaft; means for limiting the movement of said inlet and exhaust valve cams on said cam shaft, whereby the cams assume their proper relative positions for the actuation of the valves and sparker, when the cam shaft is driven in either direction.

2. In a gas engine, the combination with a driving shaft, of a sprocket wheel loosely mounted thereon having a projecting lug or tooth on the hub thereof; a collar fixed to said shaft having a projecting driving lug adapted to engage the lug on said sprocket wheel whereby the position of said sprocket wheel is shifted on the reversing of the driving shaft; a cam shaft; a sprocket wheel on said cam shaft; a connecting chain for said sprockets; exhaust and inlet valves; a sparker actuating lever having a cam projection thereon; a sparker cam having a pivoted tooth adapted to engage said cam projection on said sparker lever; an exhaust valve actuating cam loosely mounted on said cam shaft; an air inlet valve actuating cam loosely mounted on said cam shaft; means for limiting the movement of said inlet and exhaust valve cams on said cam shaft, whereby the cams assume their proper relative positions for the actuation of the valves and sparker, when the cam shaft is driven in either direction.

3. In a gas engine, the combination with a cam shaft; exhaust and inlet valves; a sparker actuating lever having a cam projection thereon; a spring for returning said sparker lever to its initial position; a sparker cam having a pivoted tooth adapted to engage said cam projection on said sparker lever; an exhaust valve actuating cam loosely mounted on said cam shaft; an air inlet valve actuating cam loosely mounted on said cam shaft; means for limiting the movement of said inlet and exhaust valve cams on said cam shaft, whereby the cams assume their proper relative positions for the actuation of the valves and sparker when the cam shaft is driven in either direction.

4. In a gas engine, the combination with a cam shaft, of exhaust and inlet valves; a sparker actuating lever having a cam projection thereon; a sparker cam having a pivoted tooth adapted to engage said cam projection on said sparker lever; an exhaust valve actuating cam loosely mounted on said cam shaft; an air inlet valve actuating cam loosely mounted on said cam shaft; means for limiting the movement of said inlet and exhaust valve cams on said cam shaft, whereby the cams assume their proper relative positions for the actuation of the valves and sparker when the cam shaft is driven in either direction.

5. In a gas engine, the combination with a cam shaft, of exhaust and inlet valves; a sparker; a sparker cam having a pivoted cam tooth; an exhaust valve actuating cam loosely mounted on said cam shaft; an air inlet valve actuating cam loosely mounted on said cam shaft; means for limiting the movement of said inlet and exhaust valve cams on said cam shaft, whereby the cams assume their proper relative positions for the actuation of the valves and sparker when the cam shaft is driven in either direction.

In witness whereof, I have hereunto set my hand and seal in the presence of two witnesses.

FRANK A. THOMAS. [L. S.]

Witnesses:
F. N. WHITESELL,
JOHN V. HAGAN.